United States Patent
Gross et al.

(10) Patent No.: US 11,392,786 B2
(45) Date of Patent: Jul. 19, 2022

(54) AUTOMATED ANALYTIC RESAMPLING PROCESS FOR OPTIMALLY SYNCHRONIZING TIME-SERIES SIGNALS

(71) Applicant: Oracle International Corporation, Redwood Shores, CA (US)

(72) Inventors: Kenny C. Gross, Escondido, CA (US); Guang C. Wang, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 940 days.

(21) Appl. No.: 16/168,193

(22) Filed: Oct. 23, 2018

(65) Prior Publication Data
US 2020/0125819 A1    Apr. 23, 2020

(51) Int. Cl.
  *G06F 11/30*    (2006.01)
  *G06K 9/00*    (2022.01)
  (Continued)

(52) U.S. Cl.
  CPC ............. *G06K 9/0055* (2013.01); *G06F 1/14* (2013.01); *G06F 11/3034* (2013.01);
  (Continued)

(58) Field of Classification Search
  CPC ..... G06K 9/0055; G06F 1/14; G06F 11/3034; G06F 11/3089; G06F 2201/835;
  (Continued)

(56) References Cited

U.S. PATENT DOCUMENTS 4,622,665 A * 11/1986 Jonsson ................ H04J 3/0688
                                                                370/516
4,937,763 A    6/1990 Mott
                (Continued)

OTHER PUBLICATIONS

PalChaudhuri, Santashil, Amit Kumar Saha, and D. B. Johnsin. "Adaptive clock synchronization in sensor networks." Third International Symposium on Information Processing in Sensor Networks, 2004. IPSN 2004. IEEE, 2004. (Year: 2004).*
(Continued)

*Primary Examiner* — Matthew J Brophy
(74) *Attorney, Agent, or Firm* — Park, Vaughan, Fleming & Dowler LLP

(57) ABSTRACT

The system receives exemplary time-series sensor signals comprising ground truth versions of signals generated by a monitored system associated with a target use case and a synchronization objective, which specifies a desired tradeoff between synchronization compute cost and synchronization accuracy for the target use case. The system performance-tests multiple synchronization techniques by introducing randomized lag times into the exemplary time-series sensor signals to produce time-shifted time-series sensor signals, and then uses each of the multiple synchronization techniques to synchronize the time-shifted time-series sensor signals across a range of different numbers of time-series sensor signals, and a range of different numbers of observations for each time-series sensor signal. The system uses the synchronization objective to evaluate results of the performance-testing in terms of compute cost and synchronization accuracy. Finally, the system selects one of the multiple synchronization techniques for the target use case based on the evaluation.

20 Claims, 18 Drawing Sheets

(51) Int. Cl.
  *G06F 1/14* (2006.01)
  *G06N 20/00* (2019.01)
  *H04L 9/40* (2022.01)

(52) U.S. Cl.
  CPC ......... *G06F 11/3089* (2013.01); *G06N 20/00* (2019.01); *H04L 63/1425* (2013.01)

(58) Field of Classification Search
  CPC ............. G06F 11/0709; G06F 11/0751; G06F 11/3006; G06F 11/3419; G06F 11/3447; G06F 11/3452; G06N 20/00; G06N 7/005; G06N 3/126; G06N 20/10; H04L 63/1425; H04L 63/1466; H04L 2463/121
  See application file for complete search history.

(56) References Cited

U.S. PATENT DOCUMENTS

| | | | |
|---|---|---|---|
| 6,032,167 A | 2/2000 | Takatsu | |
| 6,438,187 B1* | 8/2002 | Abbey | H04L 7/042 370/514 |
| 6,798,831 B1* | 9/2004 | Hatta | H04L 1/242 375/373 |
| 7,391,835 B1* | 6/2008 | Gross | G06F 11/2294 709/248 |
| 7,433,439 B1* | 10/2008 | Richmond | H03L 7/16 375/371 |
| 8,214,682 B2* | 7/2012 | Vaidyanathan | G06F 11/3495 713/400 |
| 8,365,003 B2* | 1/2013 | Gross | G06F 11/3409 713/400 |
| 9,658,910 B2* | 5/2017 | Poola | G06F 11/34 |
| 10,859,471 B2* | 12/2020 | Wewers | G06F 5/01 |
| 10,931,291 B1* | 2/2021 | Patnaik | H03L 7/093 |
| 11,210,400 B1* | 12/2021 | Wang | G06F 21/577 |
| 2007/0047590 A1* | 3/2007 | Curcio | H04N 21/4345 370/503 |
| 2009/0276821 A1* | 11/2009 | Amento | H04N 21/242 725/116 |
| 2010/0162026 A1* | 6/2010 | Gross | G06F 11/3409 713/400 |
| 2012/0197153 A1* | 8/2012 | Kraus | A61B 5/38 600/545 |
| 2014/0071344 A1* | 3/2014 | Francisco | H04N 21/23418 348/E5.009 |
| 2016/0165227 A1* | 6/2016 | Babbar | H04L 43/50 348/181 |
| 2016/0191277 A1* | 6/2016 | Li | H04L 25/14 370/465 |
| 2017/0138628 A1* | 5/2017 | Sondur | F24F 11/30 |
| 2019/0132387 A1* | 5/2019 | Singh | H04L 67/12 |
| 2020/0125819 A1* | 4/2020 | Gross | G06K 9/0055 |
| 2020/0210318 A1* | 7/2020 | Bryan | G06F 11/3632 |

OTHER PUBLICATIONS

Shao-Long, Dong, and Xing Tao. "Cluster-based power efficient time synchronization in wireless sensor networks." 2006 IEEE International Conference on Electro/Information Technology. IEEE, 2006. (Year: 2006).*

Tavares Bruscato, Leandro, Tales Heimfarth, and Edison Pignaton de Freitas. "Enhancing time synchronization support in wireless sensor networks." Sensors 17.12 (2017): 2956. (Year: 2017).*

* cited by examiner

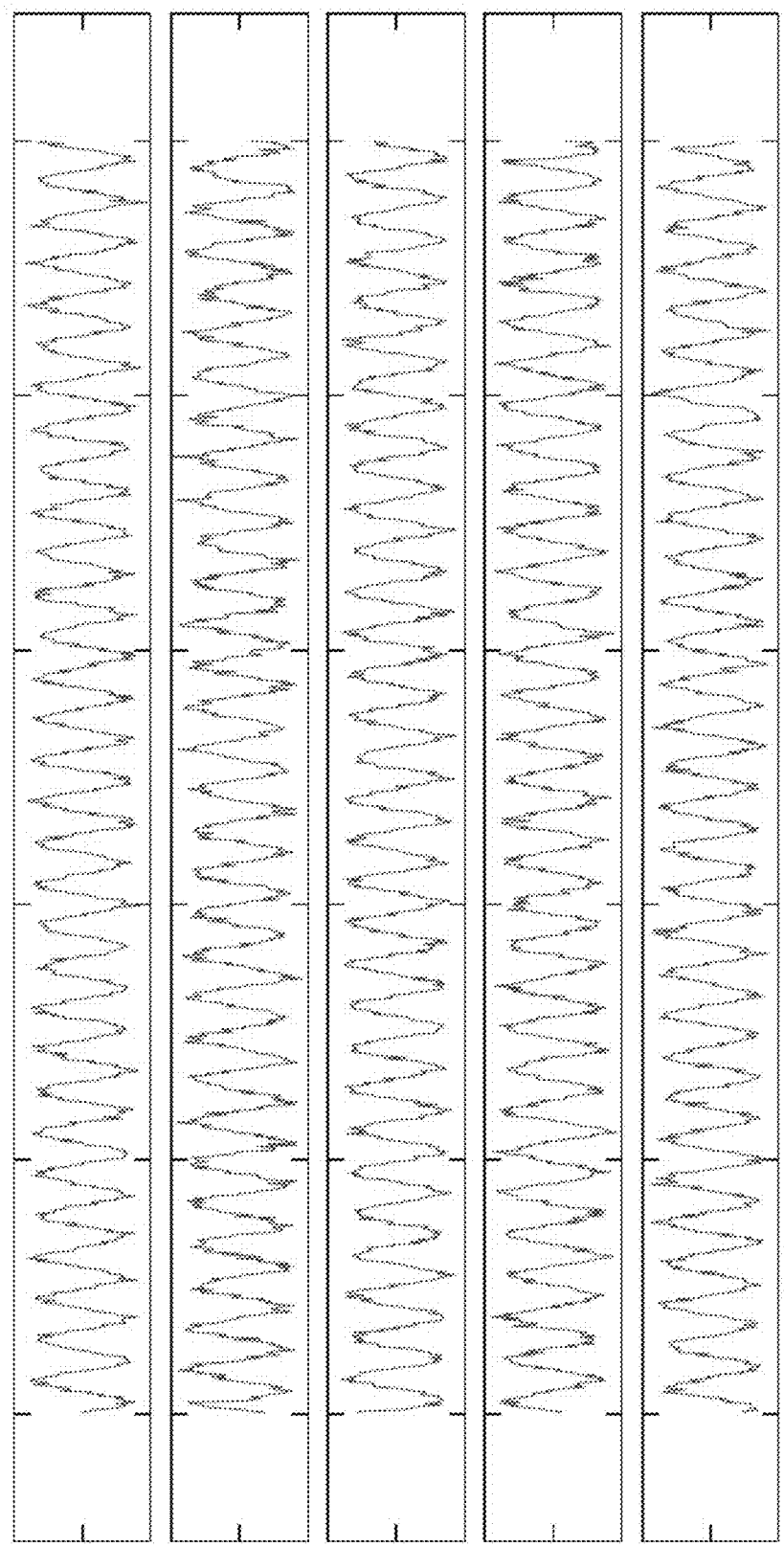

AUTOMATED ANALYTIC RESAMPLING PROCESS FOR OPTIMALLY SYNCHRONIZING TIME-SERIES SIGNALS

BACKGROUND

Field

The disclosed embodiments generally relate to techniques for synchronizing signals containing time-series sensor data. More specifically, the disclosed embodiments relate to an automated analytic resampling process (ARP), which optimizes the process of synchronizing time-series signals based on specific use case requirements.

Related Art

Large numbers of sensors are presently deployed to monitor the operational health of critical assets in different types of business-critical systems. For example, a medium-sized computer data center can include over 1,000,000 sensors monitoring thousands of servers, a modern passenger jet can include 75,000 sensors, and an oil refinery can include over 1,000,000 sensors. These sensors produce large volumes of time-series sensor data, which can be used to perform prognostic-surveillance operations to facilitate incipient anomaly detection based on the sensor data. This makes it possible to take remedial action before the incipient anomalies develop into failures in the critical assets.

Monitored systems typically include multiple data-acquisition (DAQ) modules distributed throughout their assets. These DAQ modules typically use internal clocks to generate timestamps for observations, which are aggregated by the DAQ. However, these distributed internal clocks frequently become unsynchronized due to human clock-setting errors, and from a variety of clock skew mechanisms. The resulting variable clock misalignments between signals can cause even the best pattern-recognition techniques to "blur" patterns of correlation across large-scale collections of time-series signals. This often causes excessive false-alarm probabilities (FAPs) and missed-alarm probabilities (MAPs) for associated prognostic-surveillance techniques.

One solution to this problem is to subscribe to a commercially available clock-synchronization system, which can be used to periodically synchronize a network of distributed clocks to a highly accurate centralized atomic clock. This approach has become popular in spite of the significant cost involved in producing distributed clocks that are capable of receiving and using periodic re-synchronization updates. However, this clock-synchronization technique has recently fallen out of favor after some well-publicized problems caused by hackers who were able to tap into critical assets through the clock-synchronization communications, which typically pass through an organization's firewall.

The inventors previously developed an alternative clock-synchronization technique, which requires no hardware modifications, or any penetration through a firewall. This technique, called the analytical resampling process (ARP), operates by performing machine-learning-based empirical synchronization of time-series signals, and has greatly improved associated prognostic-surveillance operations for a large number of use cases. Three different techniques for performing ARP on time-series signals have been developed. These techniques include: (1) the correlogram technique; (2) the cross power spectral density (CPSD) technique; and (3) the genetic algorithm (GA) technique.

In the correlogram technique, one signal is picked as the "reference anchor signal," meaning its timestamps will be assumed to be correct. All of the other time-series signals are empirically aligned to this reference anchor signal by computing pairwise cross-correlation coefficients, and then systematically "adjusting" the lags for individual signals to optimize the cross-correlation coefficients with respect to the reference anchor signal.

In contrast, CPSD is a bivariate frequency-domain technique that operates by using a fast Fourier transform (FFT) to infer the "phase angle" (in the frequency domain) between two time-series signals. The CPSD technique then computes an optimal estimate of lag time from the inferred phase angle. Note that pairwise computations are performed for all pairs of signals in the collection, which effectively adjusts the signals to bring the empirical lag times to zero.

The GA technique is an iterative process, wherein during each iteration signals are given random "kicks" in positive or negative directions, after which the overall synchronization score for the population is evaluated. Signal kicks that improve the synchronization score are retained for the next "generation;" kicks that worsen the synchronization score are not retained. Also, kick sizes are systematically reduced with each successive generation to prevent oscillatory behavior, which can hop over the optimum synchronization value.

Although each of the above ARP techniques suffices for empirical re-synchronization of time-series sensor signals, it is not clear which technique is the "best" for a given prognostic-monitoring use case in a specific industry. There are a number of reasons it is hard to determine which of the above ARP techniques is best. For some prognostic-surveillance use cases, "best" means the highest possible accuracy for realignment of signals. For other use cases, approximate alignment of signals (e.g., reducing clock-skews from minutes to ~10 seconds) suffices to achieve prognostic functional requirements (PFRs), but overhead compute cost is the main concern. This is true for large-scale streaming analytics, where the overhead involved in empirically re-synchronizing time-series signals can exceed available computing power. Note that both re-synchronization accuracy and overhead compute costs are complex, use-case-specific, nonlinear functions of the number of monitored signals, the sampling rates for those signals, and the signal-to-noise ratios (SNRs) for those signals. These complex nonlinear functions make it extremely hard to determine which of three different ARP techniques is "best" for a given use case.

Hence, what is needed is a technique for optimally synchronizing time-series signals based on specific use case requirements.

SUMMARY

The disclosed embodiments provide a system that synchronizes time-series sensor signals. During operation, the system receives exemplary time-series sensor signals comprising ground truth versions of signals generated by a monitored system associated with a target use case. The system also receives a synchronization objective, which specifies a desired tradeoff between synchronization compute cost and synchronization accuracy for the target use case. Next, the system performance-tests multiple synchronization techniques by introducing randomized lag times into the exemplary time-series sensor signals to produce time-shifted time-series sensor signals, and then uses each of the multiple synchronization techniques to synchronize the time-shifted time-series sensor signals across a range of different numbers of time-series sensor signals, and a range of different numbers of observations for each time-series sensor signal. The system then uses the synchronization objective to evaluate results of the performance-testing in terms of compute cost and synchronization accuracy. Finally, the system selects one of the multiple synchronization techniques for the target use case based on the evaluation.

In some embodiments, the number of observations for a given time-series sensor signal is associated with a corresponding sampling rate for the given time-series sensor signal.

In some embodiments, the multiple synchronization techniques comprise multiple analytic resampling process (ARP) techniques.

In some embodiments, the multiple APR techniques include one or more of the following: a correlogram technique; a cross power spectral density (CPSD) technique; and a genetic algorithm (GA) technique.

In some embodiments, the synchronization objective includes one of the following: a lowest possible compute cost; a highest possible synchronization accuracy; and an optimal tradeoff between compute cost and synchronization accuracy.

In some embodiments, during a training mode, the system receives training-related time-series sensor data from the monitored system for the target use case. Next, the system uses the selected synchronization technique to synchronize the training-related time-series sensor data, and trains a prognostic inferential model for a prognostic pattern-recognition system using the synchronized training-related time-series sensor data.

In some embodiments, during a surveillance mode, the system receives currently-generated time-series sensor data from the monitored system. Next, the system uses the selected synchronization technique to synchronize the currently-generated time-series sensor data, and then uses the prognostic inferential model to analyze the synchronized currently-generated time-series sensor data to detect incipient anomalies that arise during operation of the monitored system.

In some embodiments, while using the prognostic inferential model to detect incipient anomalies, the system uses the prognostic inferential model to generate estimated values for the synchronized currently-generated time-series sensor data. Next, the system performs a pairwise differencing operation between actual values and the estimated values for the synchronized currently-generated time-series sensor data to produce residuals. Finally, the system performs a sequential probability ratio test (SPRT) on the residuals to detect the incipient anomalies.

In some embodiments, detecting the incipient anomalies comprises detecting: an impending failure of the monitored system, or a malicious-intrusion event in the monitored system.

BRIEF DESCRIPTION OF THE FIGURES

FIG. 18 illustrates corresponding signals during a final stage of the synchronization process in accordance with the disclosed embodiments.

DETAILED DESCRIPTION

Figure 1:
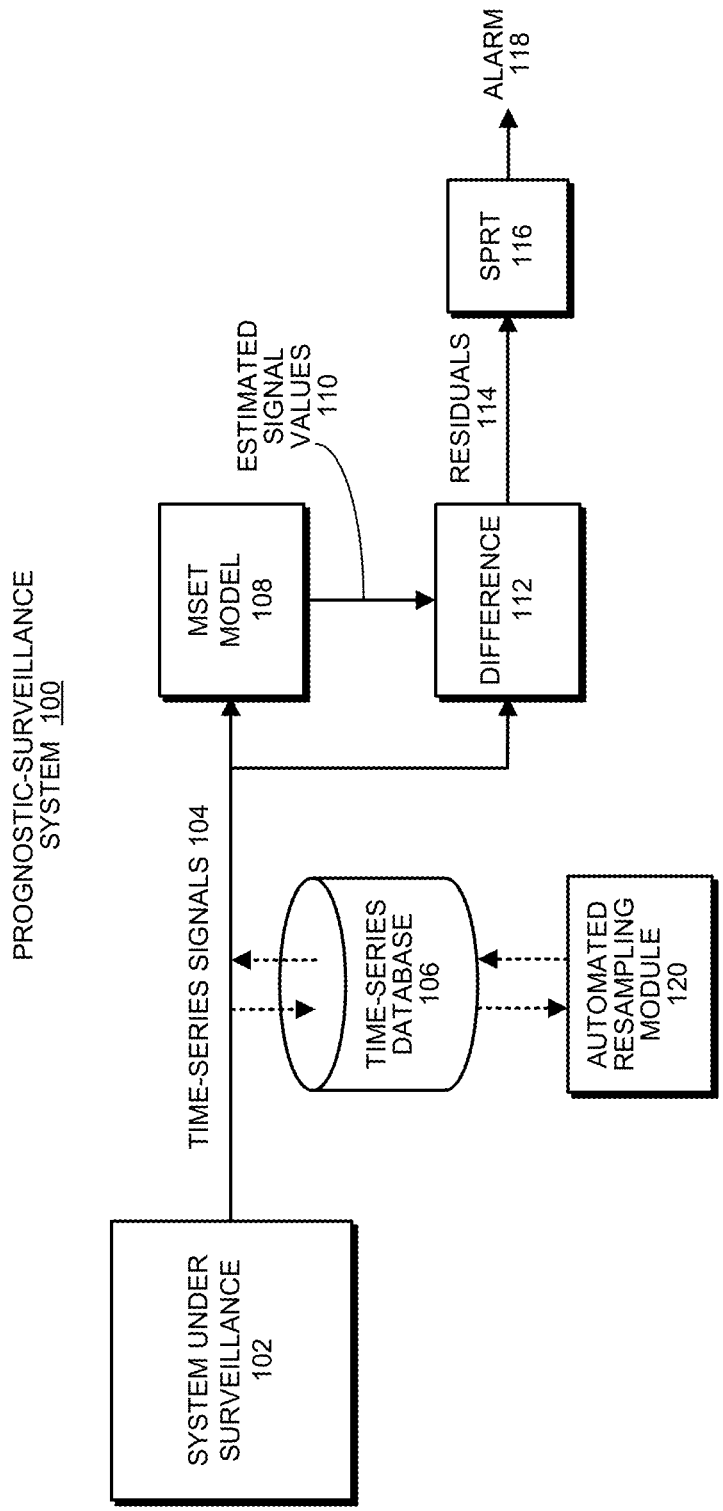
FIG. 1 illustrates an exemplary prognostic-surveillance system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide an automated and optimized analytical resampling process (ARP), which autonomously performs real-time synchronization of large-scale time-series signals. This new technique provides users with the ability to specify "ultimate accuracy" or "lowest compute cost," while synchronizing collections of time-series signals, whether from a few sensors, or thousands of sensors, and regardless of the sampling rates and signal-to-noise ratios (SNRs) of the signals.

Because of the complexity involved in determining which of a number of the possible implementations of ARP might be "best" for a given use case, we have previously used a human-intensive ad hoc approach to select the ARP technique for a specific use case. In this previous approach, a human data scientist who is knowledgeable about the different ARP techniques starts with a test dataset, and conducts a prognostic evaluation using each ARP technique separately. The scientist then analyzes the results to determine which technique achieves a specific objective for the synchronization process, such as: the best prognostic accuracy; the lowest compute cost; or a tradeoff between accuracy and compute cost. Unfortunately, this human-intensive evaluation process does not scale well to accommodate large numbers of possible use cases. Hence, it is desirable to develop an automated parametric framework, which autonomously selects an ARP technique for a specific use case based on a specified objective.

Before describing this automated framework in further detail, we first describe the structure of an exemplary prognostic-surveillance system, which makes use of the synchronized time-series sensor signals.

Exemplary Prognostic-Surveillance System

FIG. 1 illustrates an exemplary prognostic-surveillance system 100 that accesses a time-series database 106, which contains time-series signals obtained from sensors in accordance with the disclosed embodiments. As illustrated in FIG. 1, prognostic-surveillance system 100 operates on a set of time-series signals 104 obtained from sensors in a system under surveillance 102. Note that system under surveillance 102 can generally include any type of machinery or facility, which includes sensors and generates time-series signals. Moreover, time-series signals 104 can originate from any type of sensor, which can be located in a component in system under surveillance 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from system under surveillance 102 or from time-series database 106 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the estimated signal values 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annals of Mathematical Statistics*. 16 (2): 117-186.) In this way, prognostic-surveillance system 100 can proactively alert system operators of incipient anomalies, such as impending failures, hopefully with enough lead time so that such problems can be avoided or proactively fixed.

Prognostic-surveillance system 100 also includes an automated resampling module 120, which autonomously selects a specific ARP technique based on a user-specified performance objective, and then uses the selected ARP technique to synchronize signals from time-series database 106.

Selecting an ARP Technique

For any given use case involving a set of signals that will be analyzed with prognostic-surveillance techniques, the set of signals will comprise a specific number of signals, a specific number of samples (associated with a specific sampling rate), and will exhibit a characteristic signal-to-noise ratio. The challenge for a given use case is to configure an ARP technique to optimally synchronize an associated set of time-series signals. As mentioned above, this conventionally involves a time-consuming manual investigation to determine the best ARP technique to achieve a specific objective, such as maximizing synchronization accuracy, minimizing compute cost, or achieving an optimal tradeoff between maximal accuracy and lowest compute cost.

The disclosed embodiments provide a new technique, which conducts this investigation autonomously. The customer user can simply submit an exemplary dataset comprising signals she wishes to monitor through prognostic-surveillance and a specific objective for the synchronization process.

Note that the selection process analysis is different for each use case because both compute cost and synchronization accuracy are complex nonlinear functions of: the number of signals; the sampling rates of the signals; and the signal-to-noise ratios of the signals. Hence, we approach this problem with a systematic parametric evaluation technique, which varies: (1) the number of signals; (2) the number of samples for the signals (and hence the sampling rates for the signals); and (3) the signal-to-noise ratios for the signals. The technique then computes the resulting compute cost (CC) and the synchronization accuracy (measured in RMSE) for each combination of the varied parameters, and selects a specific ARP technique that optimally achieves the desired performance objective.

Figure 2:
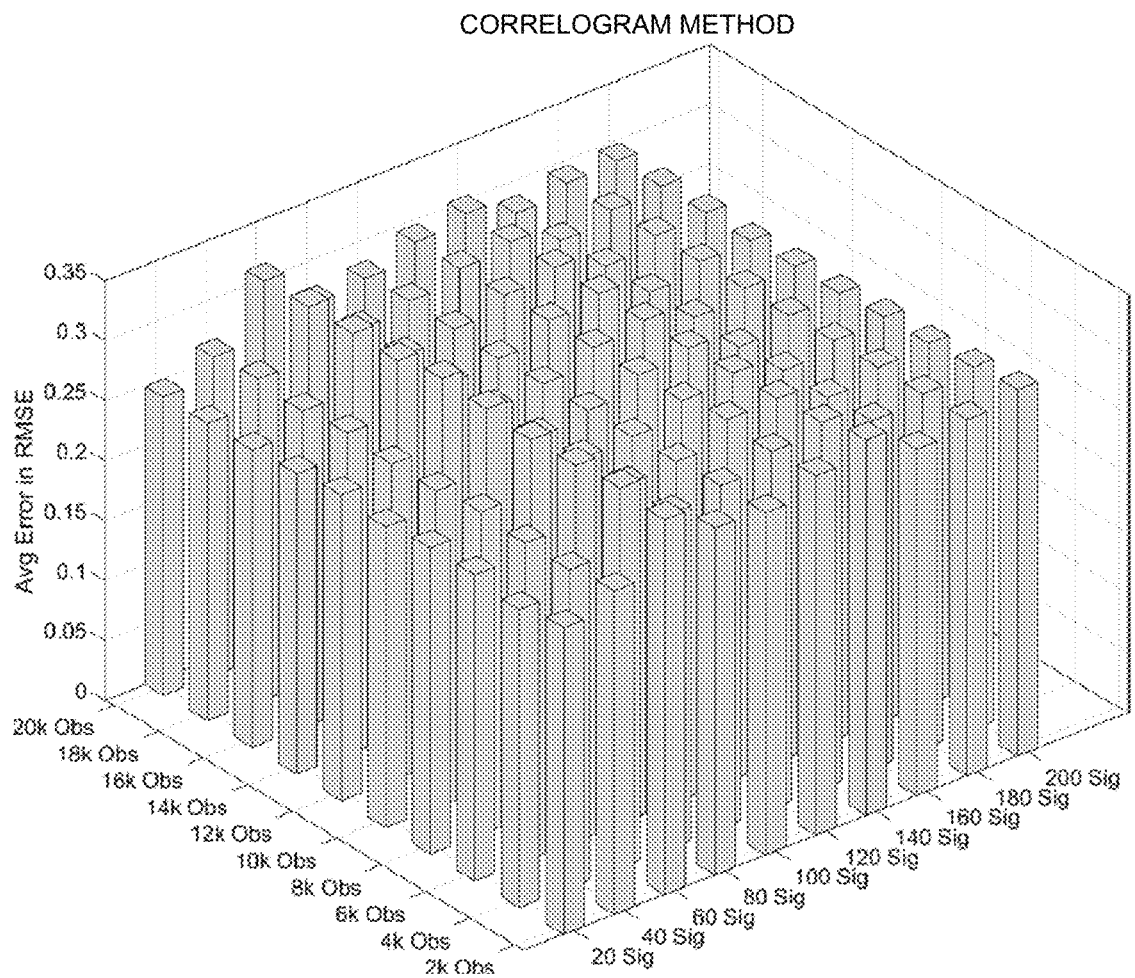
FIG. 2 presents a three-dimensional bar chart illustrating the accuracy of the correlogram technique as a function of number of observations and number of signals in accordance with the disclosed embodiments.
Figure 3:
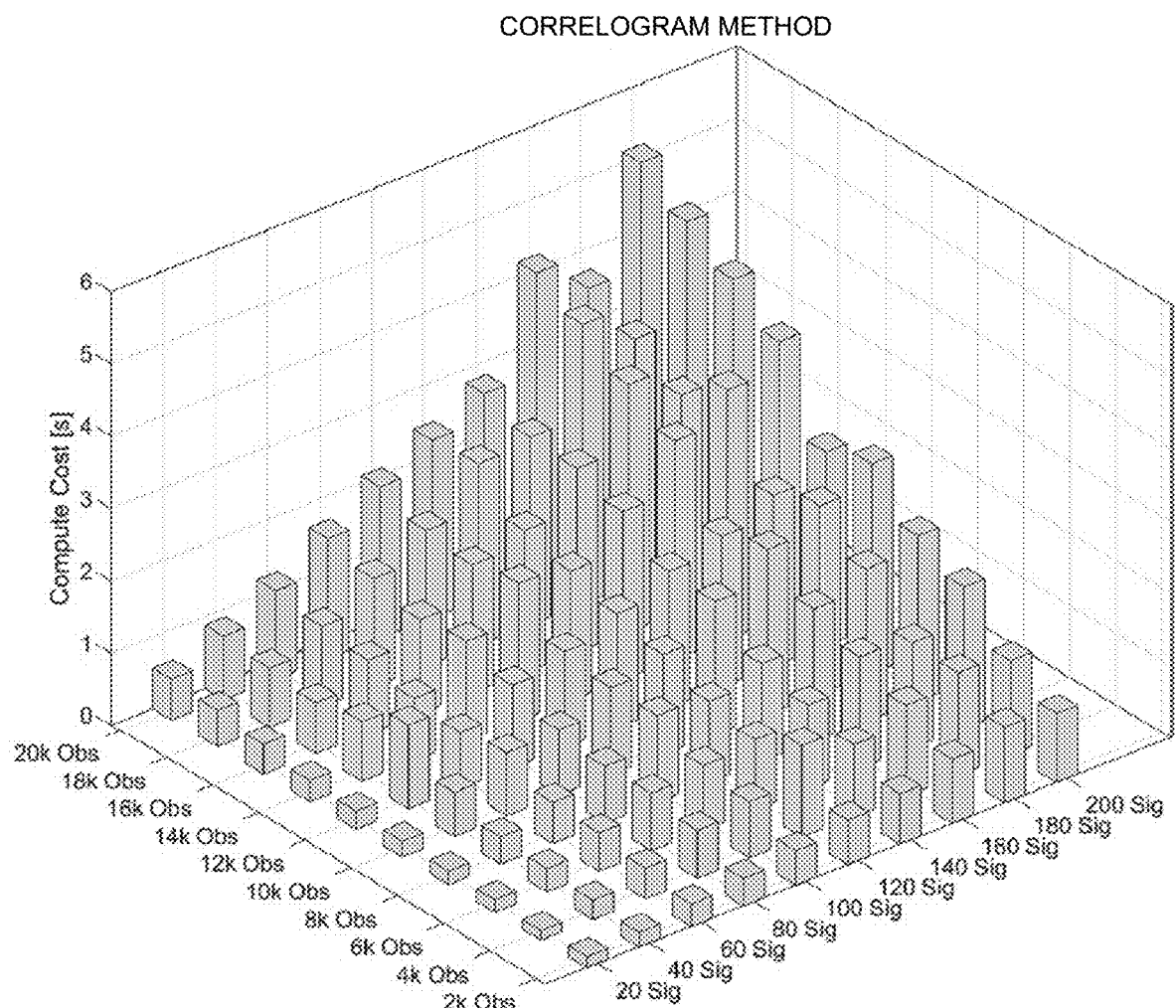
FIG. 3 presents a three-dimensional bar chart illustrating the compute cost of the correlogram technique as a function of number of observations and number of signals in accordance with the disclosed embodiments.

For example, FIG. 2 illustrates how synchronization accuracy varies for the correlogram technique as a function of number of signals and number of observations. We see that for the correlogram technique, accuracy is only mildly related to the number of signals and sampling rates. In contrast, FIG. 3 illustrates how compute cost varies substantially with the number of signals and sampling rates.

Figure 4:
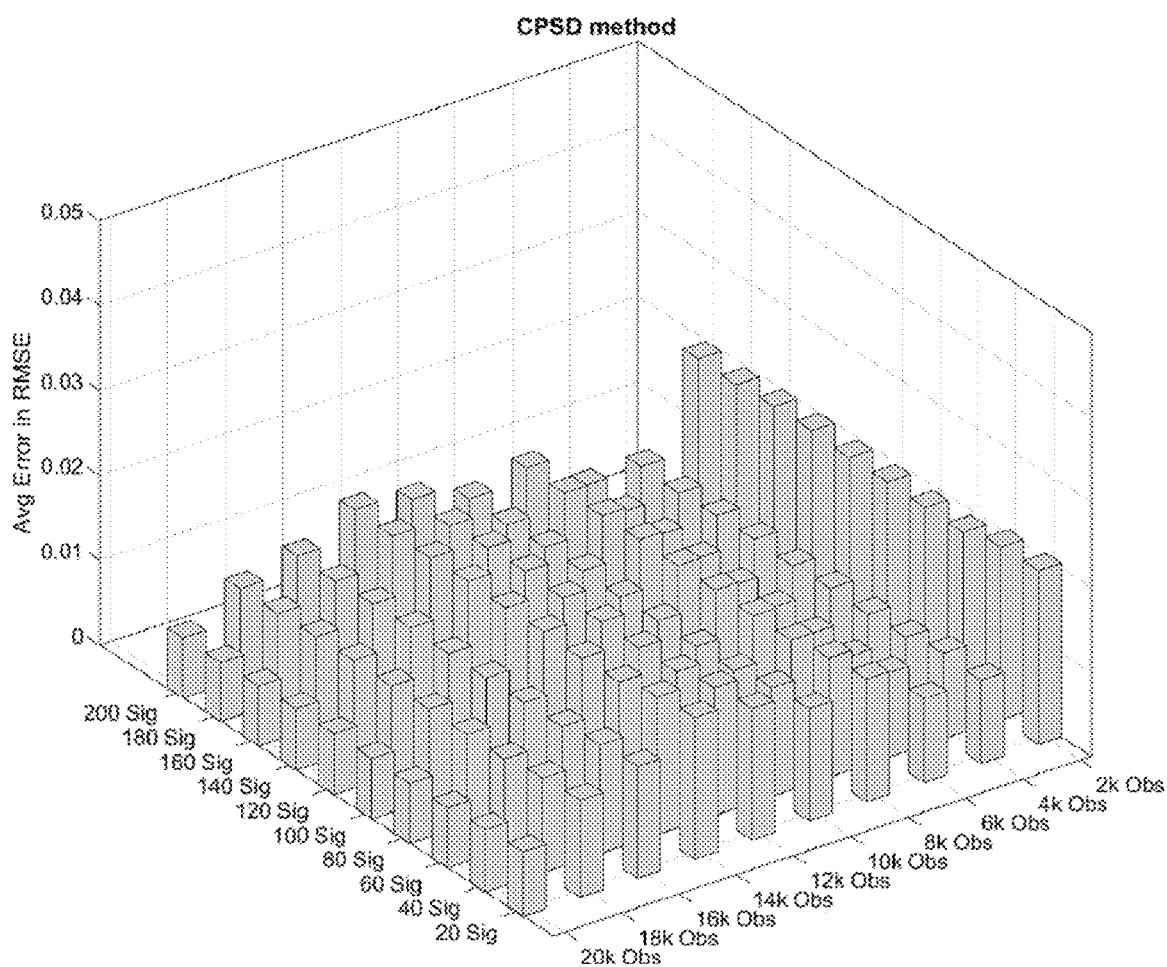
FIG. 4 presents a three-dimensional bar chart illustrating the accuracy of the CPSD technique as a function of number of observations and number of signals in accordance with the disclosed embodiments.
Figure 5:
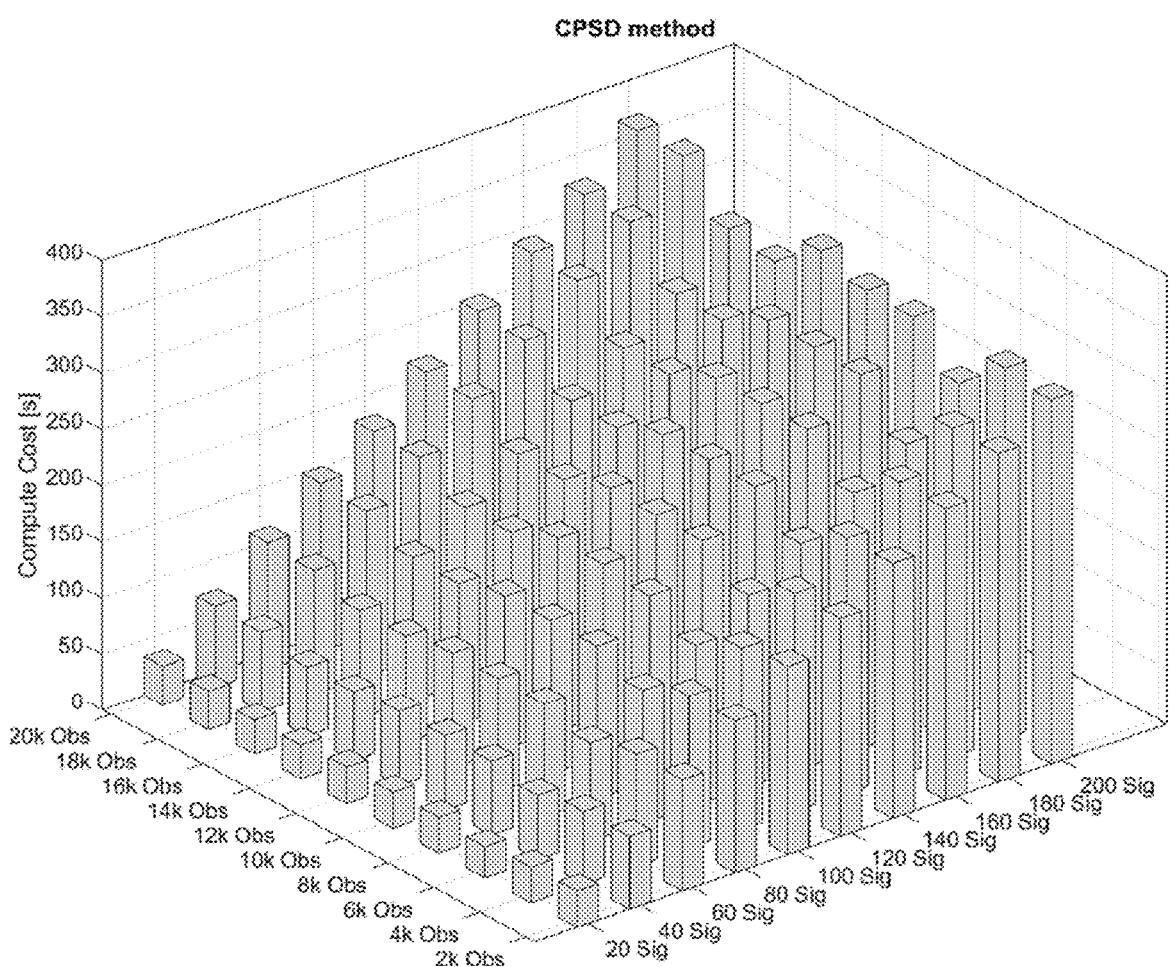
FIG. 5 presents a three-dimensional bar chart illustrating the compute cost of the CPSD technique as a function of number of observations and number of signals in accordance with the disclosed embodiments.

FIGS. 4 and 5 illustrate corresponding evaluations of accuracy and compute cost for the CPSD technique. In FIG. 5, note that compute cost is relatively invariant to the sampling rate, but is very sensitive to the number of signals for the specific use case.

Figure 6:
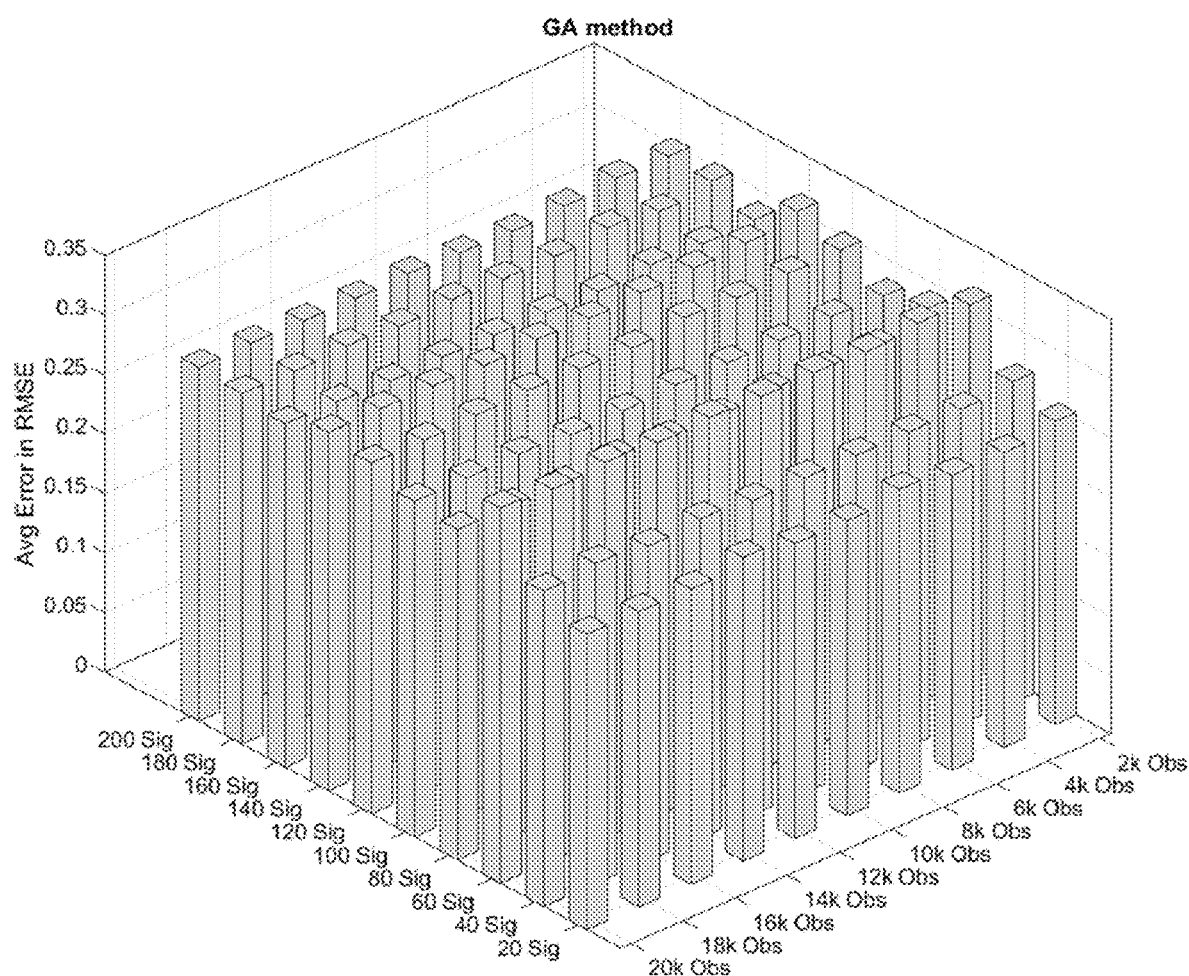
FIG. 6 presents a three-dimensional bar chart illustrating the accuracy of the GA technique as a function of number of observations and number of signals in accordance with the disclosed embodiments.
Figure 7:
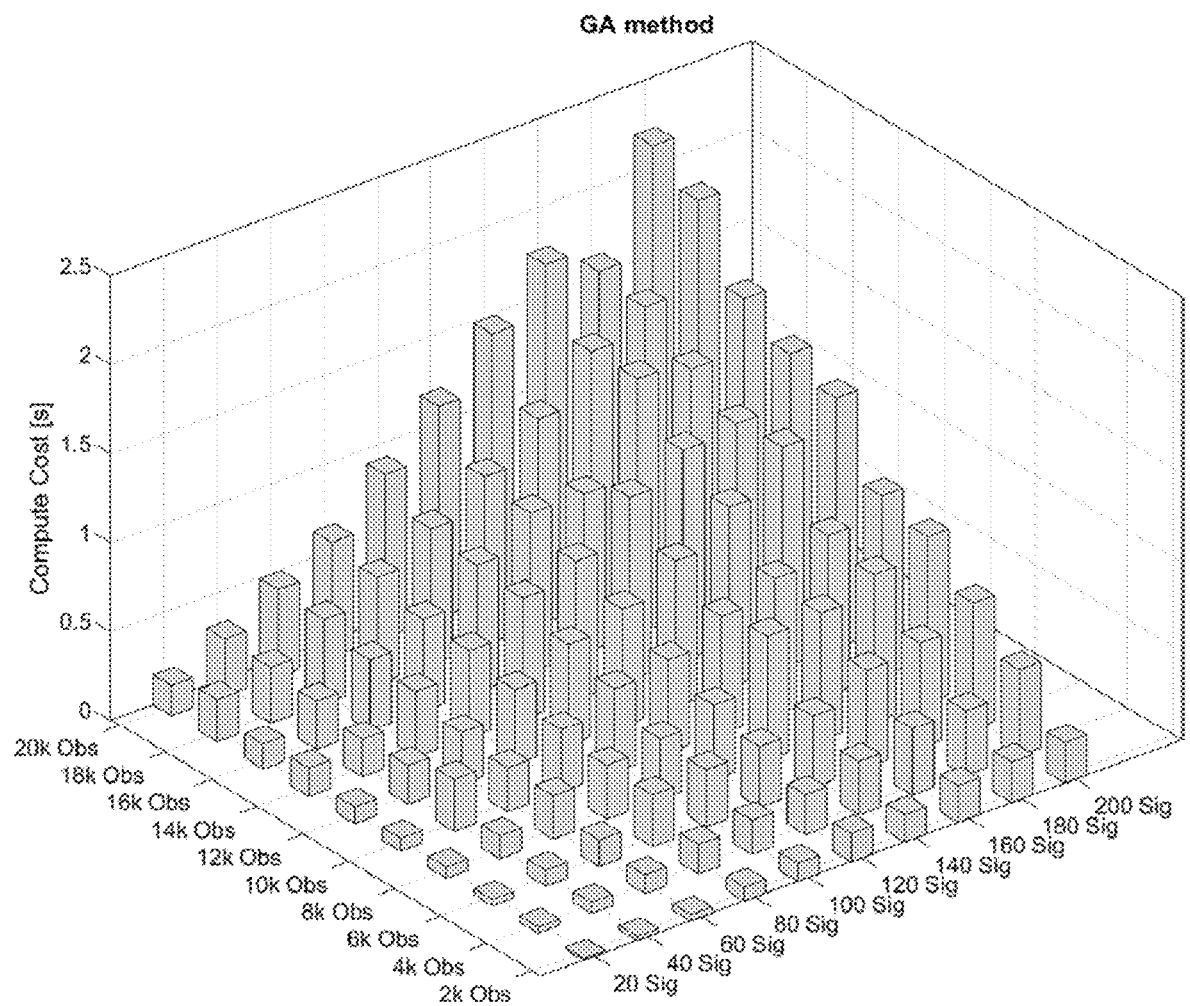
FIG. 7 presents a three-dimensional bar chart illustrating the compute cost of the GA technique method as a function of number of observations and number of signals in accordance with the disclosed embodiments.

FIGS. 6 and 7 illustrate the corresponding functional relationships between compute cost and synchronization accuracy for the genetic algorithm (GA) technique.

Figure 8:
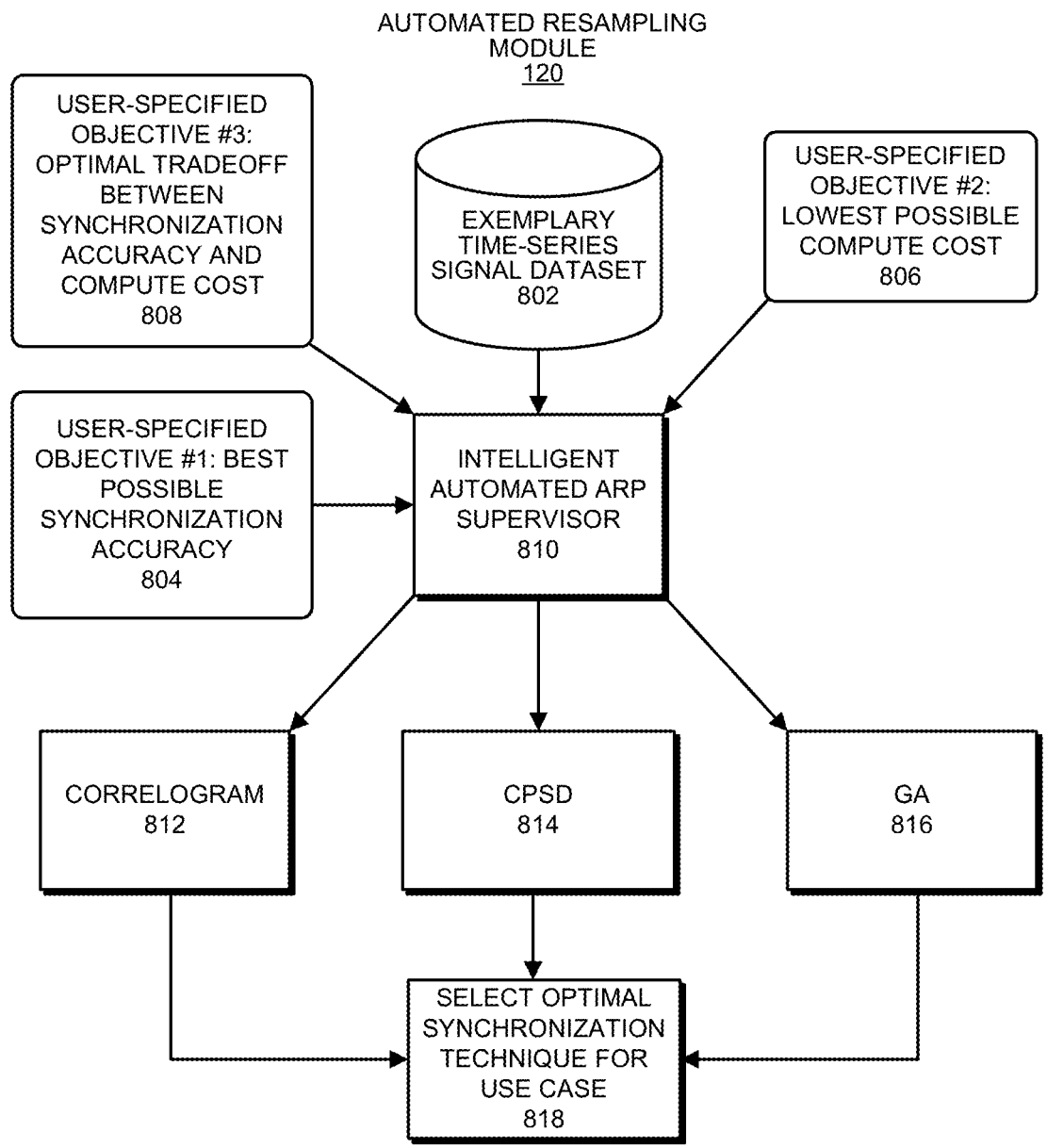
FIG. 8 presents a block diagram illustrating the automated ARP technique in accordance with the disclosed embodiments.

The graphs in FIGS. 2-7 are used by an automated optimal ARP selection system, which is illustrated schematically in FIG. 8. (Note that this ARP selection technique operates within analytic resampling module 120 illustrated in FIG. 1.) This automated system includes an intelligent automated ARP supervisor 810, which receives an exemplary time-series dataset 802 comprising a collection of time-series signals for a specific use case, and also receives a user-specified objective. FIG. 8 illustrates three possible user-specified objectives, including: (1) a maximum possible synchronization accuracy 804; (2) a lowest possible compute cost 806; and (3) an optimal tradeoff between synchronization accuracy and compute cost 808.

Then, based on exemplary time-series dataset 802 and the user-specified objective, the system analyzes a number of different ARP techniques, including: correlogram technique 812; CPSD technique 814; and (3) GA technique 816. Based on results from this analysis, the system selects an optimal synchronization technique for the specific use case.

This entire process is described in more detail below with reference to the flow charts that appear in FIGS. 9-11.

Selecting a Synchronization Technique

Figure 9:
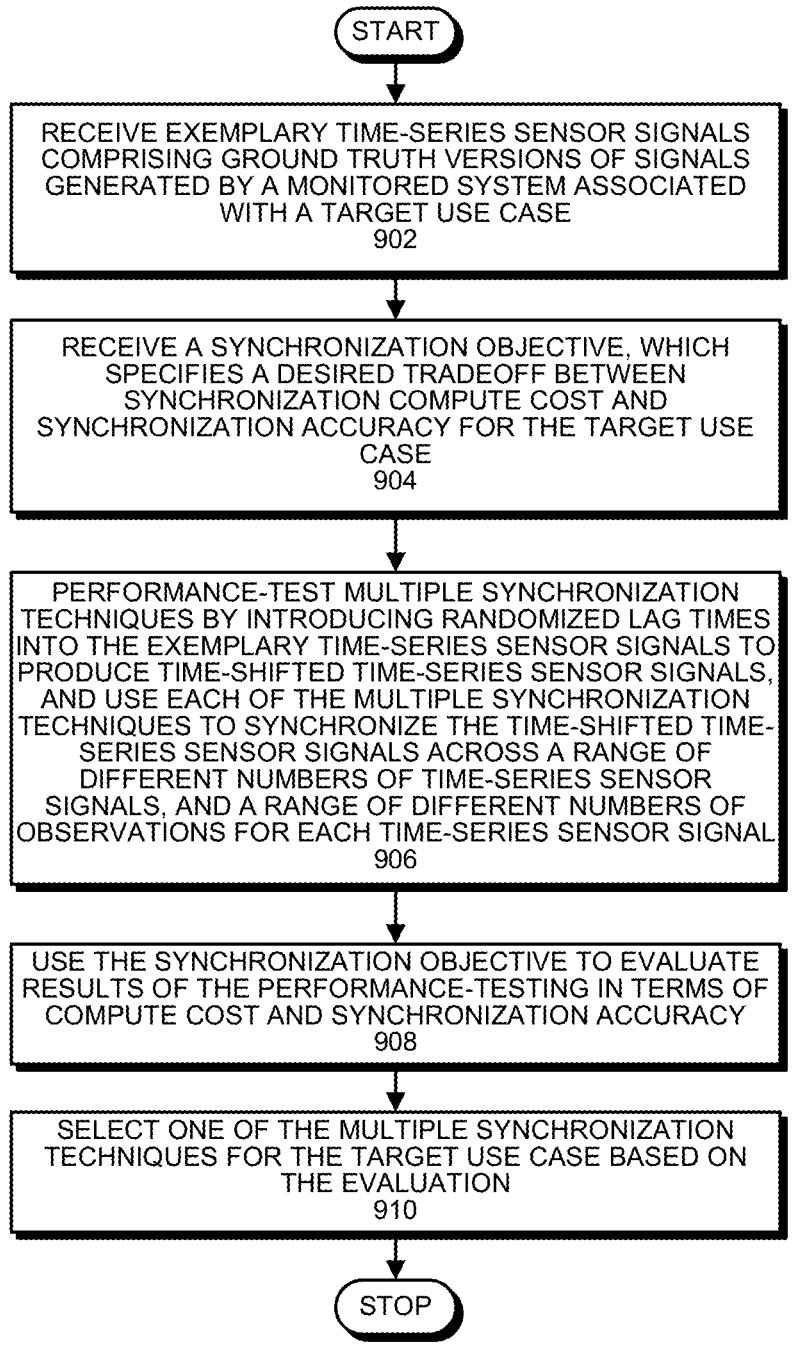
FIG. 9 presents a flow chart illustrating the process of selecting a synchronization technique for a specific use case in accordance with the disclosed embodiments.

FIG. 9 presents a flow chart illustrating the process of selecting a synchronization technique for a specific use case in accordance with the disclosed embodiments. During operation, the system receives exemplary time-series sensor signals comprising ground truth versions of signals generated by a monitored system associated with a target use case (step 902). The system also receives a synchronization objective, which specifies a desired tradeoff between synchronization compute cost and synchronization accuracy for the target use case (step 904). Next, the system performance-tests multiple synchronization techniques by introducing randomized lag times into the exemplary time-series sensor signals to produce time-shifted time-series sensor signals, and then uses each of the multiple synchronization techniques to synchronize the time-shifted time-series sensor signals across a range of different numbers of time-series sensor signals, and a range of different numbers of observations for each time-series sensor signal (step 906). Next, the system uses the synchronization objective to evaluate results of the performance-testing in terms of compute cost and synchronization accuracy (step 908). Finally, the system selects one of the multiple synchronization techniques for the target use case based on the evaluation (step 910).

Figure 10:
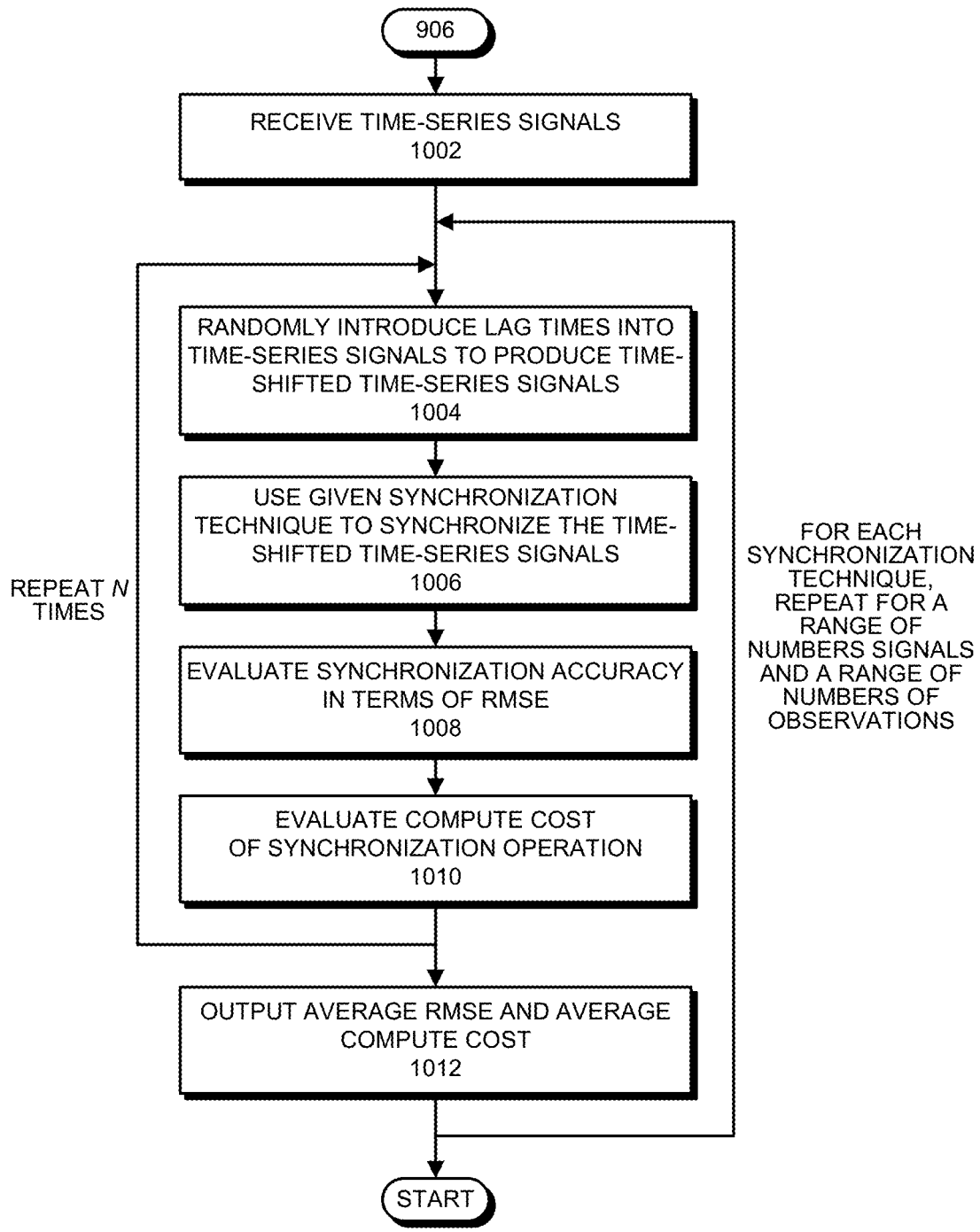
FIG. 10 presents a flow chart illustrating the process of performance-testing multiple synchronization techniques in accordance with the disclosed embodiments.

FIG. 10 presents a flow chart illustrating the process of performance-testing multiple synchronization techniques in accordance with the disclosed embodiments. (This flow chart illustrates in more detail the operations performed in step 906 of the flow chart in FIG. 9.) At the start of this process, the system receives time-series signals (step 1002) to be used to test the multiple synchronization techniques. Next, for a given synchronization technique, a given number of signals and a given number of observations, the system performs the following operations. First, the system introduces randomized lag times into the exemplary time-series sensor signals to produce time-shifted, time-series sensor signals (step 1004). Next, the system uses the given synchronization technique to synchronize the time-shifted, time-series sensor signals (step 1006). The system then evaluates the synchronization accuracy in terms of root-mean-square error (RMSE) (step 1008). The system also evaluates the compute cost of the synchronization operation (step 1010). Steps 1004 to 1010 are repeated N times for the given synchronization technique, the given number of signals and the given number of observations. Finally, the system outputs the average RMSE and average compute cost for the given synchronization technique, the given number of signals and the given compute cost (step 1012). As indicated by the arrow on the right-hand side of the flow chart, for each synchronization technique, this process is repeated for a range of numbers of signals and a range of numbers of observations.

Detecting Anomalies

Figure 11:
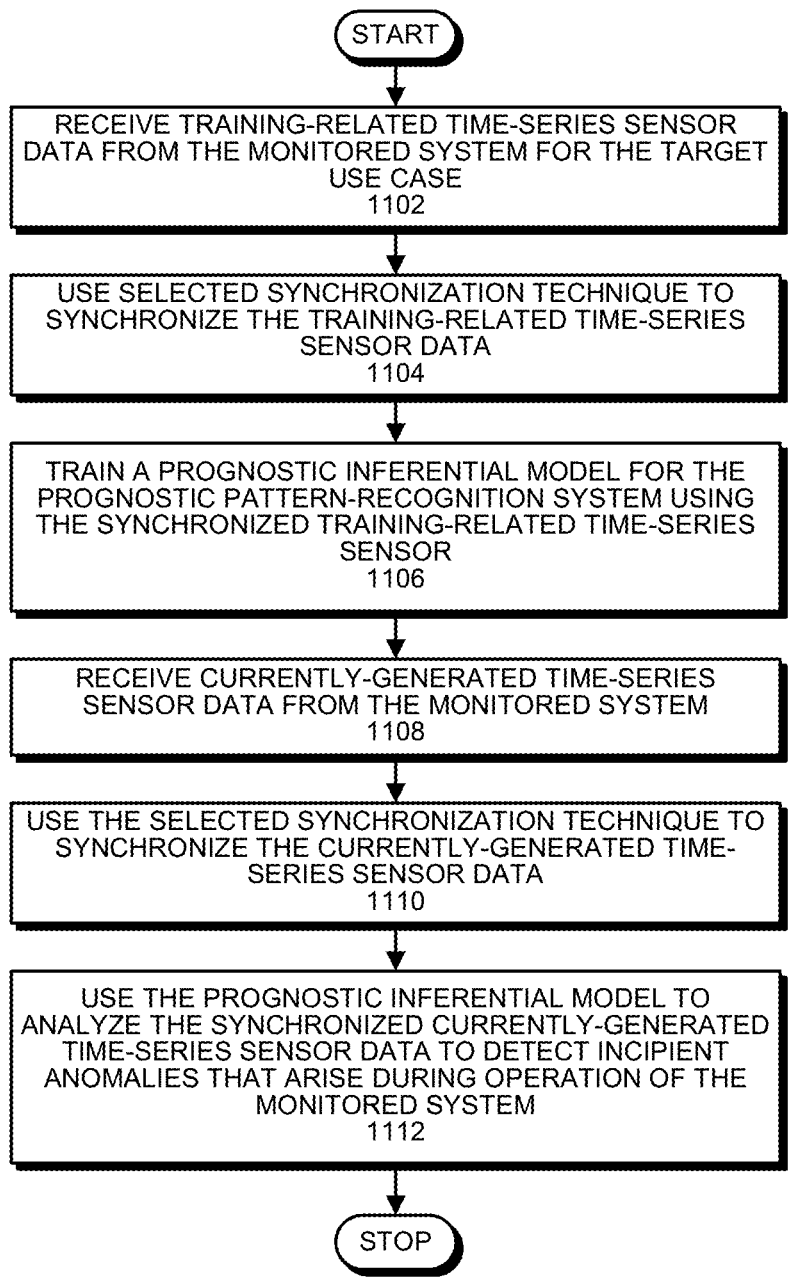
FIG. 11 presents a flow chart illustrating the process of using an inferential model to detect incipient anomalies based on time-series sensor data, which is synchronized using the selected synchronization technique, in accordance with the disclosed embodiments.

FIG. 11 presents a flow chart illustrating the process of using an inferential model to detect incipient anomalies based on time-series sensor data, which is synchronized using the selected synchronization technique, in accordance with the disclosed embodiments. First, during a training mode for a prognostic-surveillance system, the system receives training-related time-series sensor data from the monitored system for the target use case (step 1102). Next, the system uses the selected synchronization technique to synchronize the training-related time-series sensor data (step 1104), and then trains a prognostic inferential model for the prognostic pattern-recognition system using the synchronized training-related time-series sensor data (step 1106.) Then, during a surveillance mode for the prognostic pattern-recognition system, the system receives currently-generated time-series sensor data from the monitored system (step 1108), and uses the selected synchronization technique to synchronize the currently-generated time-series sensor data (step 1110). Finally, the system uses the prognostic inferential model to analyze the synchronized currently-generated time-series sensor data to detect incipient anomalies that arise during operation of the monitored system (step 1112).

Empirical Results

Figure 12:
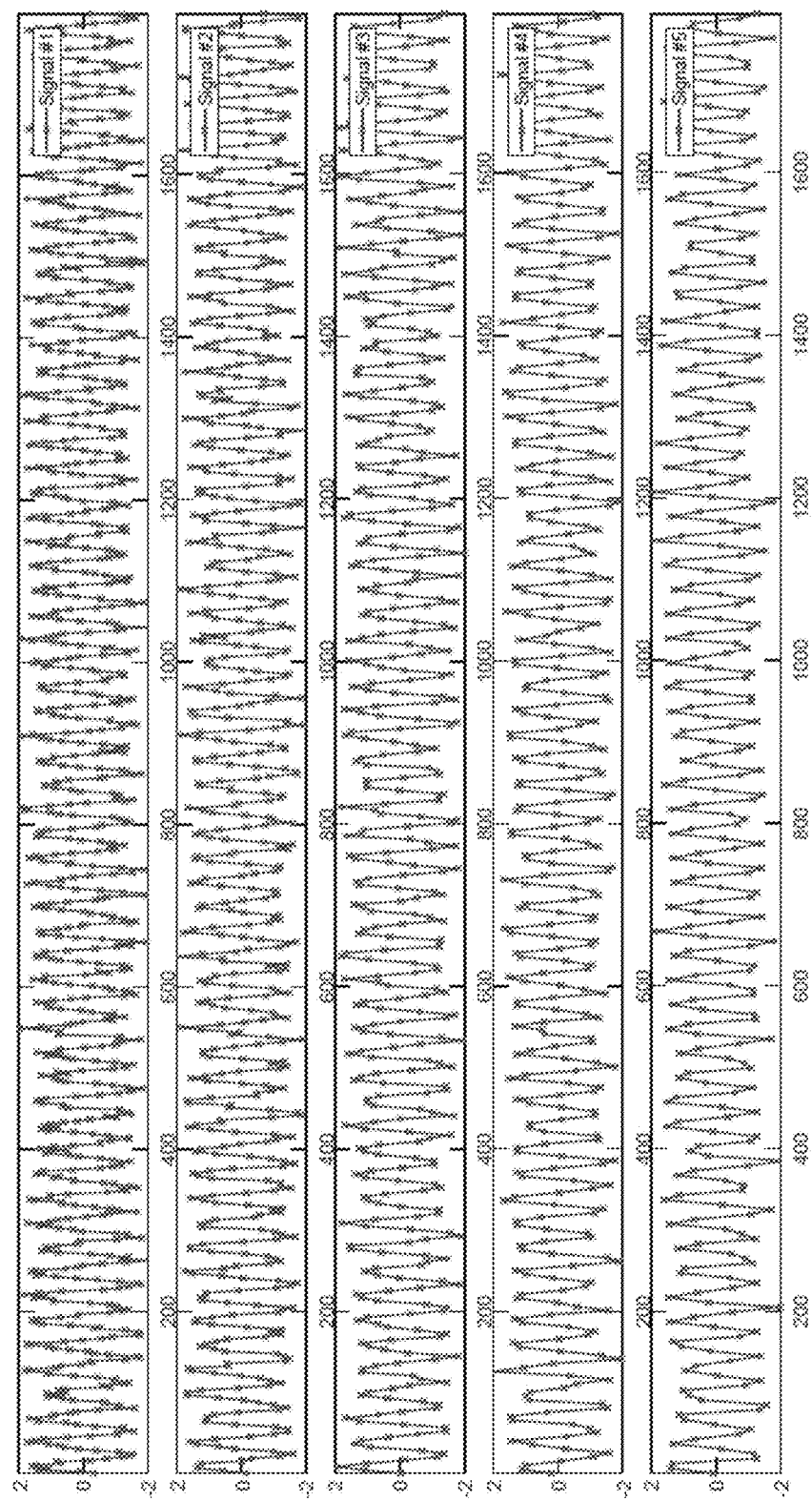
FIG. 12 illustrates five signals with non-uniform sampling rates in accordance with the disclosed embodiments.
Figure 13:
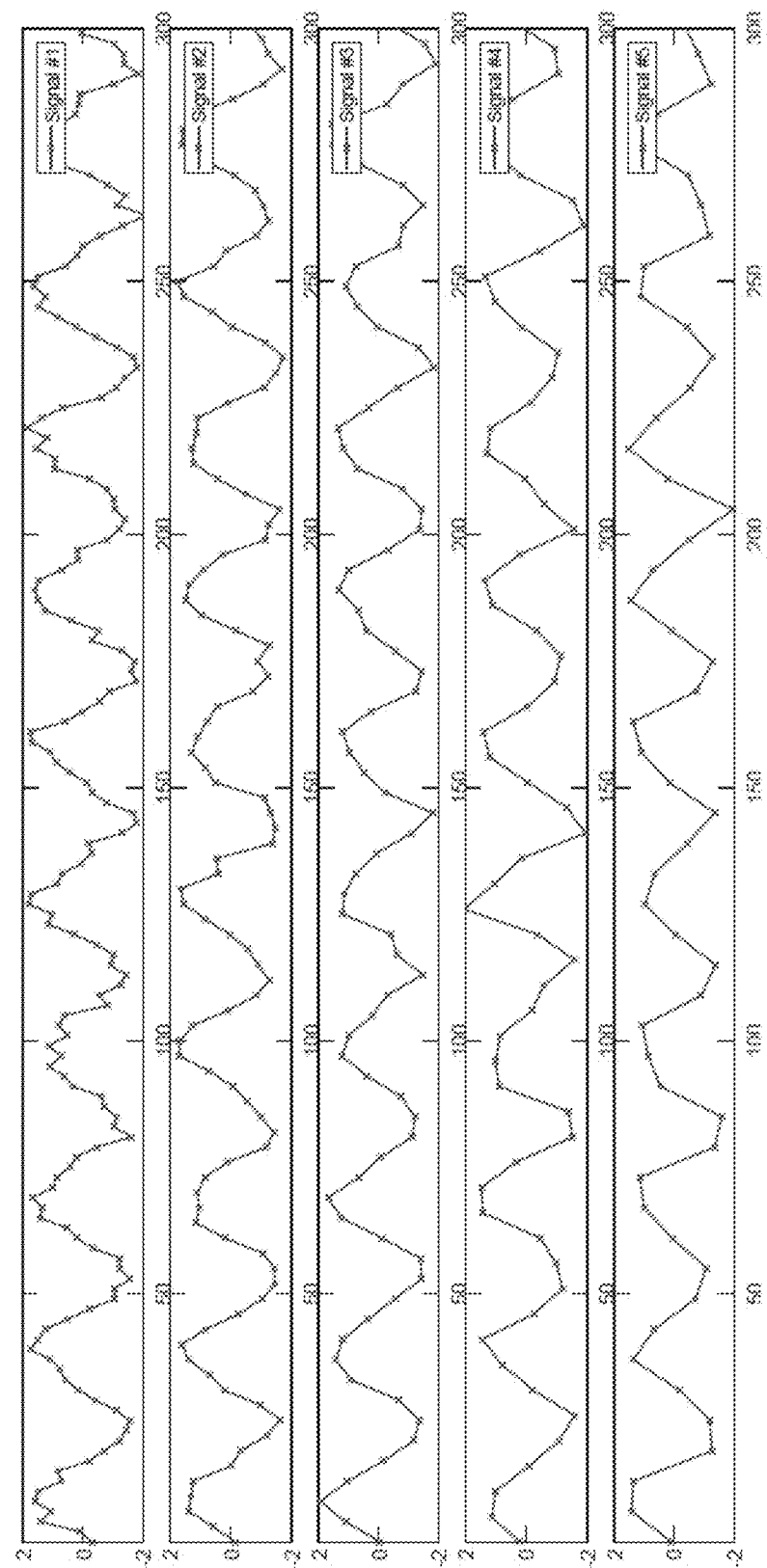
FIG. 13 illustrates a zoomed-in view of the five signals with non-uniform sampling rates in accordance with the disclosed embodiments.
Figure 14:
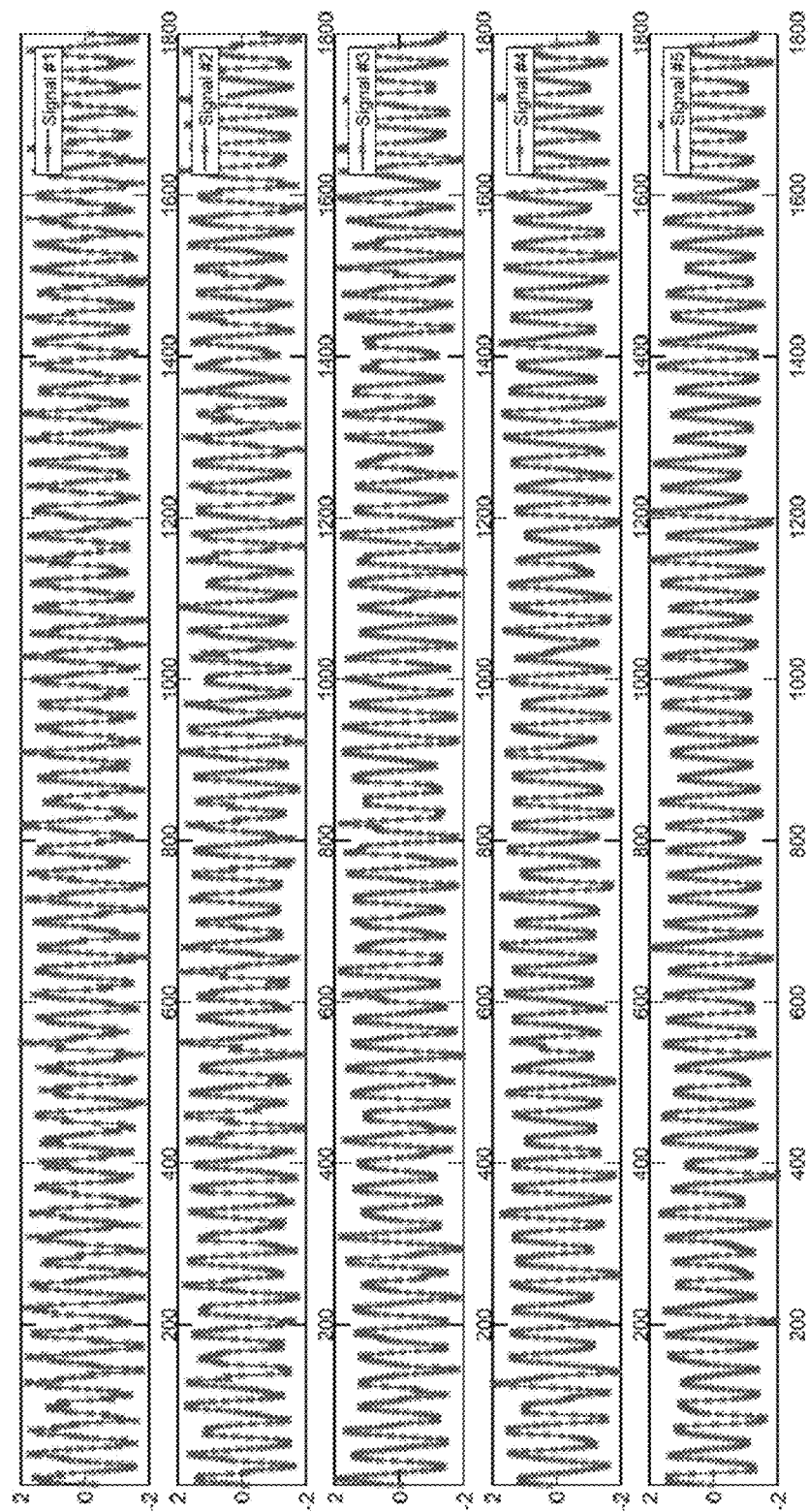
FIG. 14 illustrates five signals with uniform up-sampled rates in accordance with the disclosed embodiments.
Figure 15:
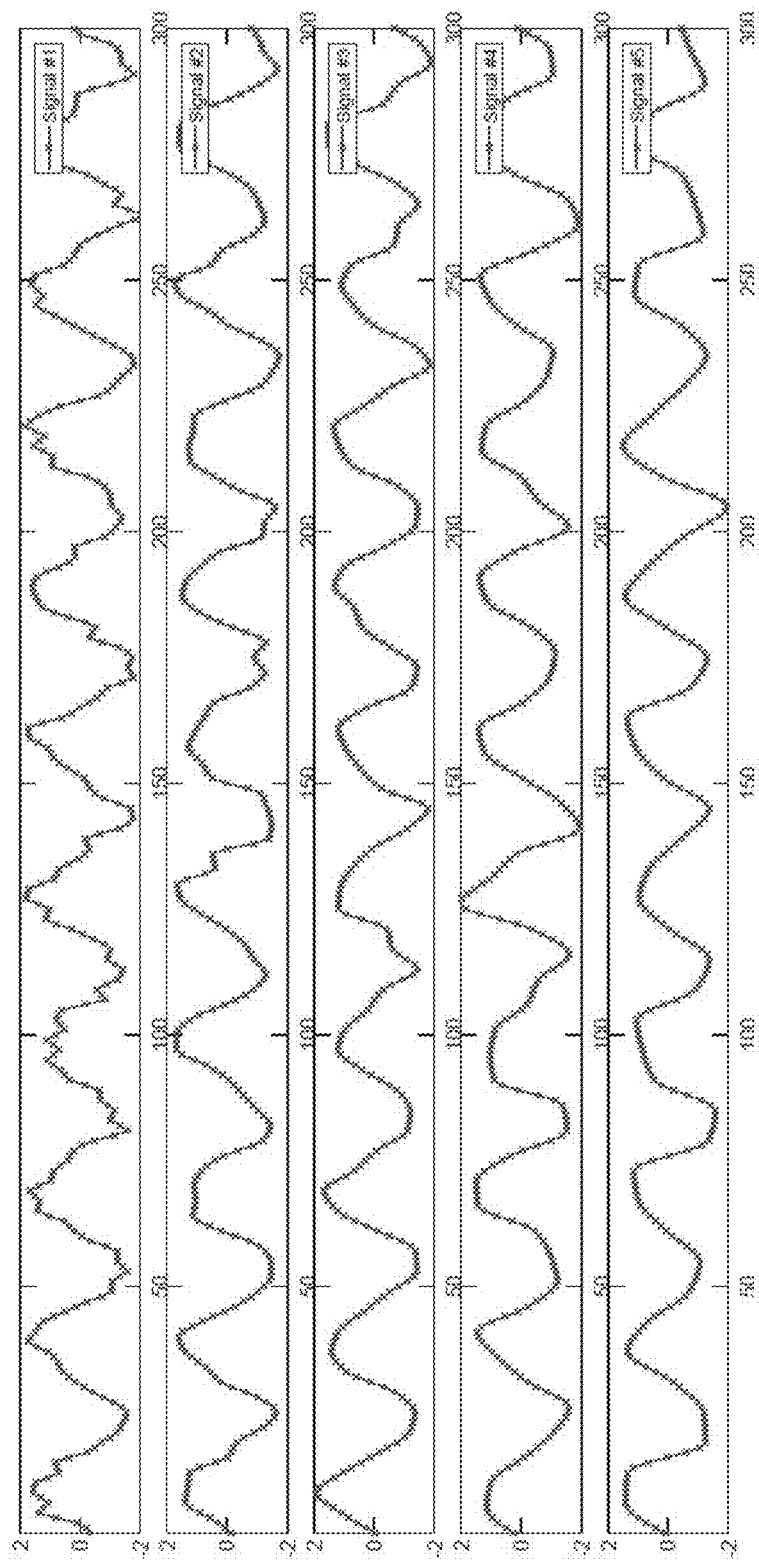
FIG. 15 illustrates a zoomed-in view of the five signals with uniform up-sampled rates in accordance with the disclosed embodiments.

Various stages of the synchronization process are illustrated in FIGS. 12-18. More specifically, FIG. 12 illustrates five signals with non-uniform sampling rates and FIG. 13 illustrates a zoomed-in view of the same five signals. In contrast, FIG. 14 illustrates the same five signals now with uniform up-sampled rates and FIG. 15 illustrates a zoomed-in view of the same five signals.

Figure 16:
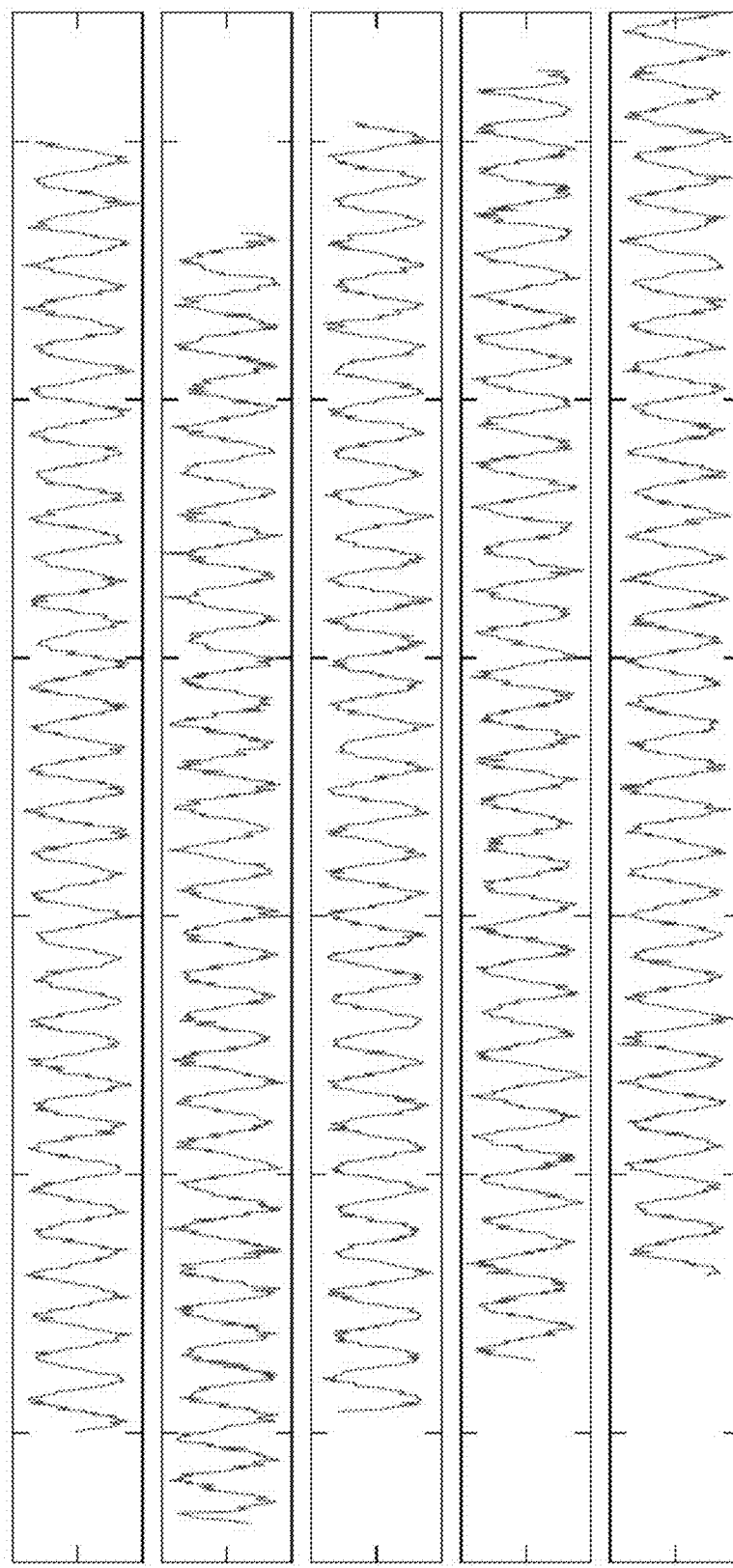
FIG. 16 illustrates five signals with clock-mismatch issues during an initial stage of the synchronization process in accordance with the disclosed embodiments.
Figure 17:
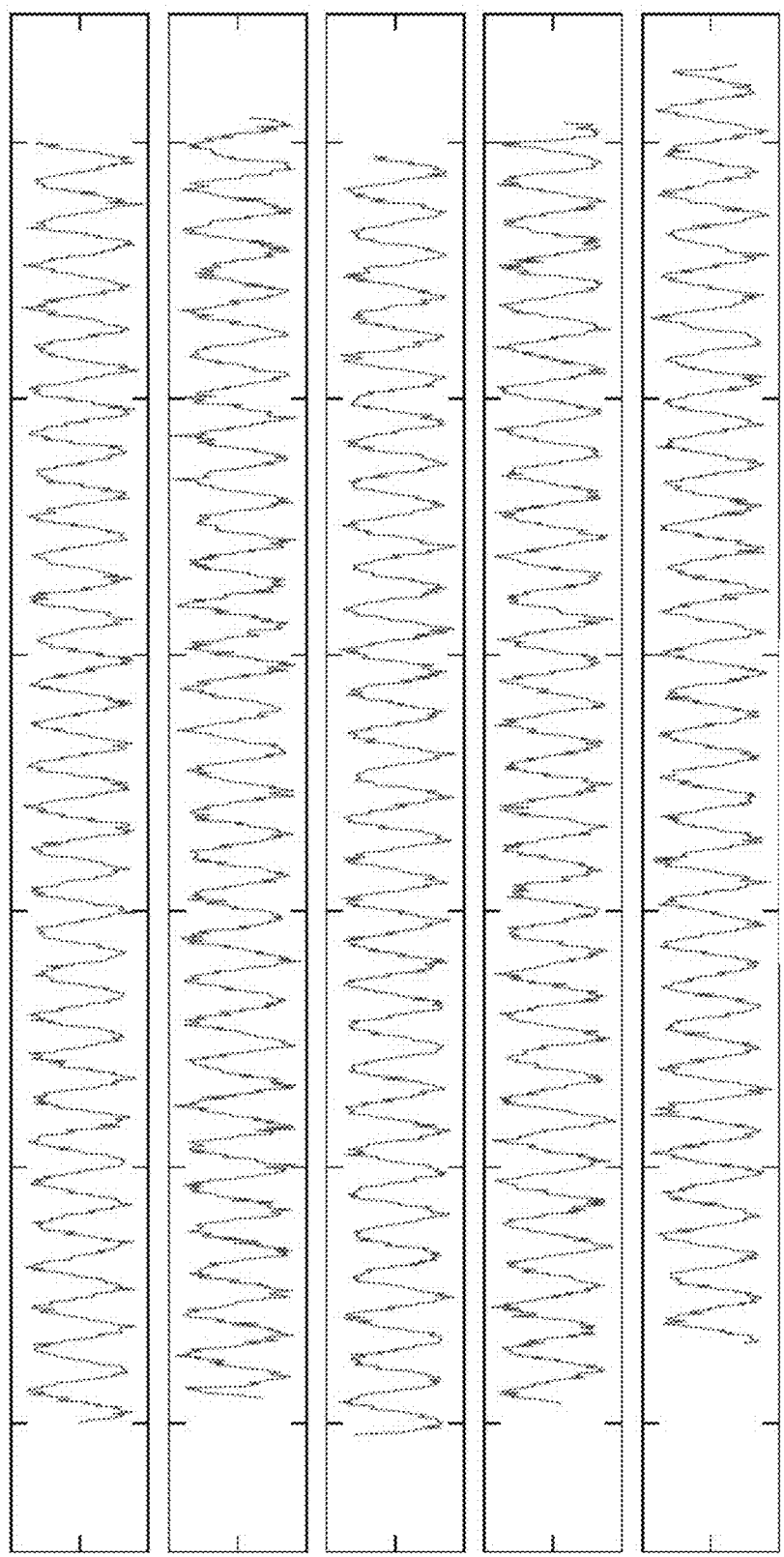
FIG. 17 illustrates corresponding signals during an intermediate stage of the synchronization process in accordance with the disclosed embodiments.

FIG. 16 illustrates five signals with clock-mismatch issues during an initial stage of the synchronization process. FIG. 17 illustrates the same five signals during an intermediate stage of the synchronization process. Finally, FIG. 18 illustrates the same five signals during a final stage of the synchronization process. Note that the resulting synchronized signals are well-aligned.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claim.

What is claimed is:

1. A method for synchronizing time-series sensor signals, comprising:
    receiving exemplary time-series sensor signals comprising ground truth versions of signals generated by a monitored system associated with a target use case;
    receiving a synchronization objective, which specifies a desired tradeoff between synchronization compute cost and synchronization accuracy for the target use case;
    performance-testing multiple synchronization techniques by introducing randomized lag times into the exemplary time-series sensor signals to produce time-shifted time-series sensor signals, and using each of the multiple synchronization techniques to synchronize the time-shifted time-series sensor signals across a range of different numbers of time-series sensor signals, and a range of different numbers of observations for each time-series sensor signal;
    using the synchronization objective to evaluate results of the performance-testing in terms of compute cost and synchronization accuracy; and
    selecting one of the multiple synchronization techniques for the target use case based on the evaluation.

2. The method of claim 1, wherein the number of observations for a given time-series sensor signal is associated with a corresponding sampling rate for the given time-series sensor signal.

3. The method of claim 1, wherein the multiple synchronization techniques comprise multiple analytic resampling process (ARP) techniques.

4. The method of claim 1, wherein the multiple APR techniques include one or more of the following:
    a correlogram technique;
    a cross power spectral density (CPSD) technique; and
    a genetic algorithm (GA) technique.

5. The method of claim 1, wherein the synchronization objective includes one of the following:
    a lowest possible compute cost;
    a highest possible synchronization accuracy; and
    an optimal tradeoff between compute cost and synchronization accuracy.

6. The method of claim 1, wherein the method further comprises:
    during a training mode for a prognostic pattern-recognition system,
        receiving training-related time-series sensor data from the monitored system for the target use case,
        using the selected synchronization technique to synchronize the training-related time-series sensor data, and
        training a prognostic inferential model for the prognostic pattern-recognition system using the synchronized training-related time-series sensor data; and
    during a surveillance mode for the prognostic pattern-recognition system,
        receiving currently-generated time-series sensor data from the monitored system,
        using the selected synchronization technique to synchronize the currently-generated time-series sensor data, and
        using the prognostic inferential model to analyze the synchronized currently-generated time-series sensor data to detect incipient anomalies that arise during operation of the monitored system.

7. The method of claim 6, wherein using the prognostic inferential model to detect incipient anomalies comprises:
    using the prognostic inferential model to generate estimated values for the synchronized currently-generated time-series sensor data;
    performing a pairwise differencing operation between actual values and the estimated values for the synchronized currently-generated time-series sensor data to produce residuals; and
    performing a sequential probability ratio test (SPRT) on the residuals to detect the incipient anomalies.

8. The method of claim 6, wherein detecting the incipient anomalies comprises detecting one or more of the following:
    an impending failure of the monitored system; and
    a malicious-intrusion event in the monitored system.

9. A non-transitory, computer-readable storage medium storing instructions that when executed by a computer cause the computer to perform a method for synchronizing time-series sensor signals, the method comprising:
    receiving exemplary time-series sensor signals comprising ground truth versions of signals generated by a monitored system associated with a target use case;
    receiving a synchronization objective, which specifies a desired tradeoff between synchronization compute cost and synchronization accuracy for the target use case;
    performance-testing multiple synchronization techniques by introducing randomized lag times into the exemplary time-series sensor signals to produce time-shifted time-series sensor signals, and using each of the multiple synchronization techniques to synchronize the time-shifted time-series sensor signals across a range of different numbers of time-series sensor signals, and a range of different numbers of observations for each time-series sensor signal;
    using the synchronization objective to evaluate results of the performance-testing in terms of compute cost and synchronization accuracy; and
    selecting one of the multiple synchronization techniques for the target use case based on the evaluation.

10. The non-transitory, computer-readable storage medium of claim 9, wherein the number of observations for a given time-series sensor signal is associated with a corresponding sampling rate for the given time-series sensor signal.

11. The non-transitory, computer-readable storage medium of claim 9, wherein the multiple synchronization techniques comprise multiple analytic resampling process (ARP) techniques.

12. The non-transitory, computer-readable storage medium of claim 9, wherein the multiple APR techniques include one or more of the following:
a correlogram technique;
a cross power spectral density (CPSD) technique; and
a genetic algorithm (GA) technique.

13. The non-transitory, computer-readable storage medium of claim 9, wherein the synchronization objective includes one of the following:
a lowest possible compute cost;
a highest possible synchronization accuracy; and
an optimal tradeoff between compute cost and synchronization accuracy.

14. The non-transitory, computer-readable storage medium of claim 9, wherein the method further comprises:
during a training mode for a prognostic pattern-recognition system,
receiving training-related time-series sensor data from the monitored system for the target use case,
using the selected synchronization technique to synchronize the training-related time-series sensor data, and
training a prognostic inferential model for the prognostic pattern-recognition system using the synchronized training-related time-series sensor data; and
during a surveillance mode for the prognostic pattern-recognition system,
receiving currently-generated time-series sensor data from the monitored system,
using the selected synchronization technique to synchronize the currently-generated time-series sensor data, and
using the prognostic inferential model to analyze the synchronized currently-generated time-series sensor data to detect incipient anomalies that arise during operation of the monitored system.

15. The non-transitory, computer-readable storage medium of claim 14, wherein using the prognostic inferential model to detect incipient anomalies comprises:
using the prognostic inferential model to generate estimated values for the synchronized currently-generated time-series sensor data;
performing a pairwise differencing operation between actual values and the estimated values for the synchronized currently-generated time-series sensor data to produce residuals; and
performing a sequential probability ratio test (SPRT) on the residuals to detect the incipient anomalies.

16. The non-transitory, computer-readable storage medium of claim 14, wherein detecting the incipient anomalies comprises detecting one or more of the following:
an impending failure of the monitored system; and
a malicious-intrusion event in the monitored system.

17. A system that synchronizes time-series sensor signals, comprising:
at least one processor and at least one associated memory; and
a synchronization mechanism that executes on the at least one processor, wherein during operation, the synchronization mechanism:
receives exemplary time-series sensor signals comprising ground truth versions of signals generated by a monitored system associated with a target use case;
receives a synchronization objective, which specifies a desired tradeoff between synchronization compute cost and synchronization accuracy for the target use case;
performance-tests multiple synchronization techniques by introducing randomized lag times into the exemplary time-series sensor signals to produce time-shifted time-series sensor signals, and uses each of the multiple synchronization techniques to synchronize the time-shifted time-series sensor signals across a range of different numbers of time-series sensor signals, and a range of different numbers of observations for each time-series sensor signal;
uses the synchronization objective to evaluate results of the performance-testing in terms of compute cost and synchronization accuracy; and
selects one of the multiple synchronization techniques for the target use case based on the evaluation.

18. The system of claim 17, wherein the multiple synchronization techniques comprise multiple analytic resampling process (ARP) techniques, which include one or more of the following:
a correlogram technique;
a cross power spectral density (CPSD) technique; and
a genetic algorithm (GA) technique.

19. The system of claim 17, wherein the synchronization objective includes one of the following:
a lowest possible compute cost;
a highest possible synchronization accuracy; and
an optimal tradeoff between compute cost and synchronization accuracy.

20. The system of claim 17,
wherein during a training mode for a prognostic pattern-recognition system, the synchronization mechanism:
receives training-related time-series sensor data from the monitored system for the target use case,
uses the selected synchronization technique to synchronize the training-related time-series sensor data, and
trains a prognostic inferential model for the prognostic pattern-recognition system using the synchronized training-related time-series sensor data; and
wherein during a surveillance mode for the prognostic pattern-recognition system, the synchronization mechanism:
receives currently-generated time-series sensor data from the monitored system,
uses the selected synchronization technique to synchronize the currently-generated time-series sensor data, and
uses the prognostic inferential model to analyze the synchronized currently-generated time-series sensor data to detect incipient anomalies that arise during operation of the monitored system.

* * * * *

UNITED STATES PATENT AND TRADEMARK OFFICE
CERTIFICATE OF CORRECTION

| | | |
|---|---|---|
| PATENT NO. | : 11,392,786 B2 | |
| APPLICATION NO. | : 16/168193 | |
| DATED | : July 19, 2022 | |
| INVENTOR(S) | : Gross et al. | |

It is certified that error appears in the above-identified patent and that said Letters Patent is hereby corrected as shown below:

In the Specification

In Column 2, Line 10, delete "fast" and insert -- Fast --, therefor.

In Column 3, Line 17, delete "APR" and insert -- ARP --, therefor.

In the Claims

In Column 9, Line 55, in Claim 4, delete "APR" and insert -- ARP --, therefor.

In Column 11, Line 6, in Claim 12, delete "APR" and insert -- ARP --, therefor.

Signed and Sealed this
Third Day of January, 2023

*Katherine Kelly Vidal*

Katherine Kelly Vidal
*Director of the United States Patent and Trademark Office*